Feb. 26, 1957  J. W. STREATER ET AL  2,783,423
SHADED POLE MOTOR CONTROL APPARATUS
Filed July 23, 1954

INVENTORS.
JACK W. STREATER
BY WILLIAM J. POPOWSKY
Arthur H. Swanson
ATTORNEY.

United States Patent Office 2,783,423
Patented Feb. 26, 1957

2,783,423
SHADED POLE MOTOR CONTROL APPARATUS

Jack W. Streater, Levittown, and William J. Popowsky, Philadelphia, Pa., assignors to Minneapolis-Honeywell Regulator Company, Minneapolis, Minn., a corporation of Delaware Application July 23, 1954, Serial No. 445,328

6 Claims. (Cl. 318—32)

A general object of the present invention is to provide a new and improved control apparatus for an electric motor. More specifically, this invention is concerned with a new and improved control apparatus which utilizes the properties of transistors for controlling the operation of a reversible shaded pole motor.

In a shaded pole motor, alternating current flowing in the main motor winding induces voltages in the shading coils. These voltages will cause currents to flow in the shading coils having magnitudes and phases dependent upon the impedances of the shading coils and the external circuits connected thereto. One method of regulating the operation of this type of motor is to control the impedances of the circuits connected to the shading coils so that one pair of shading coils is made more effective than the other. Such regulation may be achieved by adjusting the bias applied to a transistor so that it exhibits either extremely high or extremely low impedance characteristics when connected in a control circuit.

Accordingly, another specific object of the present invention is to employ transistors as variable impedance elements for controlling the operation of a shaded pole motor.

Generally, transistors, unlike vacuum tubes, require relatively low energizing voltages. It is therefore another specific object of the present invention to energize the transistors in the motor control circuit with the voltages induced in the shading coils of the shaded pole motor being controlled.

It is a further object of the present invention to provide a new and improved percent on time control for a shaded pole motor in which reversible motor operation is obtained by varying, in one direction or the other, the contacting time of a synchronous vibrating switch.

A still further object of the present invention is to employ the amplifying properties of transistors to reduce sparking at the contacts of a vibrating control switch and thereby increase contact life.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which are illustrated and described preferred embodiments of this invention.

Figure 1:
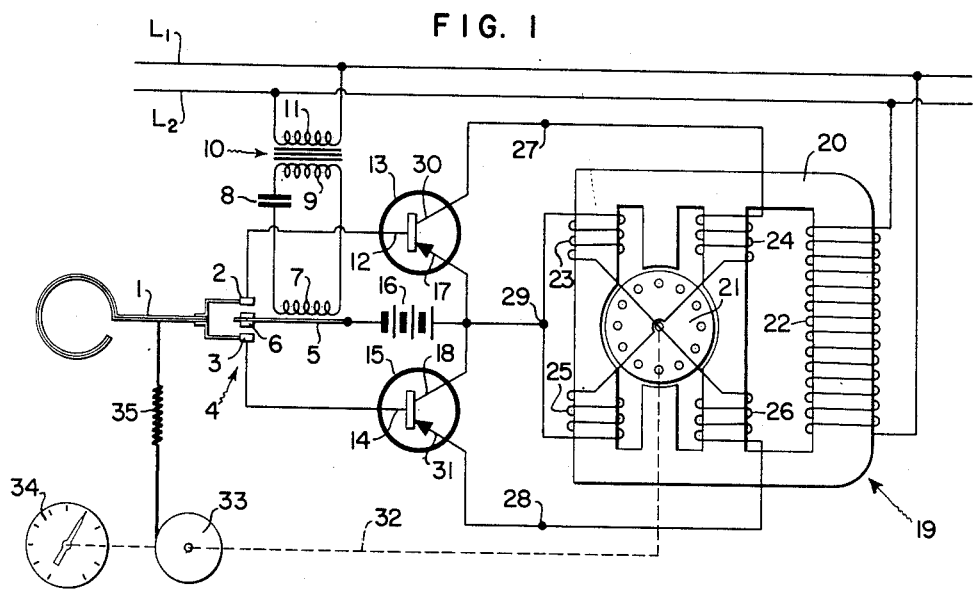
Fig. 1 is a schematic diagram showing an embodiment of the present invention employed in a self-balancing measuring apparatus.

Referring first to Fig. 1, the numeral 1 indicates a bimetallic temperature sensing element which is employed to position the contacts 2 and 3 of a synchronous vibrating switch 4. Synchronous vibrating switch 4 includes, in addition to the contacts 2 and 3, a reed 5, carrying a pair of contacts 6, which is caused to vibrate between the contacts 2 and 3 under the influence of the varying magnetic field produced by the coil 7. The coil 7 is connected through the condenser 8 to the secondary winding 9 to the transformer 10 which has its primary winding 11 connected across the conductors $L_1$ and $L_2$. The contact 2 is connected to the base 12 of the transistor 13 and similarly, the contact 3 is connected to the base 14 of the transistor 15. The transistors 13 and 15 are junction type transistors having high gains and which are capable of handling relatively large amounts of current. One commercially available transistor of this type is the 2N57 transistor manufactured by the Minneapolis-Honeywell Regulator Company. The reed 5 is connected through the battery 16 to the emitter 17 of the transistor 13 and to the emitter 18 of the transistor 15 which are connected together.

The transistors 13 and 15 control the operation of a reversible shaded pole motor 19. The motor 19 comprises a stator 20 and a squirrel cage rotor 21. The stator 20 has wound thereon a main motor winding 22 and four shading coils 23, 24, 25, and 26. The main motor winding 22 is connected across the alternating current carrying conductors $L_1$ and $L_2$. The shading coils 23, 24, 25 and 26 are connected together to form two pairs of interconnected shading coils having end terminals 27 and 28 and a common terminal 29. The end terminal 27 is connected to the collector 30 of the transistor 13 and the end terminal 28 is connected to the collector 31 of the transistor 15. The common terminal 29 is connected to the junction of the emitters 17 and 18 of the transistors 13 and 15 respectively. The rotor 21, the motor 19 is connected by the coupling means 32 to the drum 33 and the indicator 34. The drum 33 is operative to control the tension of the spring 35 which is connected thereto and to the bi-metallic element 1.

In the operation of a shaded pole induction motor of the type shown in Fig. 1, alternating current flowing in the main motor winding sets up an alternating flux field which induces voltages in the rotor bars and the shading coils. These voltages cause alternating currents to flow in the rotor bars and in the shading coils and the external circuits connected thereto. These currents in turn set up flux fields. If the magnitudes of the currents flowing in the shading coils are sufficient and if they are in a proper phase relationship with the current flowing in the main motor winding, the flux fields set up by the currents flowing in the shading coils will interact with the flux fields set up by the current in the main motor winding to produce a resultant flux field which will sweep the rotor. The resultant flux field will interact with the flux fields set up by the currents flowing in the rotor bars causing rotation of the rotor in a direction dependent upon the phase relationship between the currents in the shading coils and the current in the main motor winding. Since the phase and magnitude of the currents flowing in the shading coils depends upon the impedance of the shading coils and the external circuits connected thereto, the speed and direction of motor rotation can be regulated by controlling the impedances of the external circuits connected to the shading coils.

In the embodiment of the present invention shown in Fig. 1, the transistors 13 and 15 are employed as variable impedance elements in the external circuits connected to the shading coils of the motor 19. As shown, the emitter-collector circuit of the transistor 13 is connected across the pair of shading coils formed by the interconnected shading coils 24 and 25. Similarly, the emitter-collector circuit of the transistor 15 is connected across the pair of shading coils formed by the interconnected shading coils 23 and 26. One pair of these shading coils controls the rotation of the motor in one direction and the other pair of shading coils controls the rotation of the motor in the opposite direction.

Shaded pole induction motor 19, in addition to being a motor, can be considered to be a transformer and having for a primary winding the main motor winding 22 and for a secondary winding the interconnected shading coils 23, 24, 25 and 26. With the interconnection shown in Fig. 1, these coils form a center tap secondary winding having end terminals 27 and 28 and a center tap 29. One half of this winding comprises a pair of shading coils formed by the interconnected shading coils 24 and 25 and the other half of the winding comprises the pair of shading coils formed by the interconnected shading coils 23 and 26. Alternating current flowing in the main motor winding induces voltages in both halves of this winding which are 180° out of phase with each other and which are either in phase or 180° out of phase with the voltages across the alternating current conductors $L_1$ and $L_2$. Transistors, unlike vacuum tubes, can be energized with relatively low voltages. Accordingly, the transistors 13 and 15 are energized directly from the shading coils of the shaded pole motor 19. The turns ratios of the shading coils 23, 24, 25 and 26 with respect to the main motor winding 22 are selected so as to provide suitable voltages for energizing the transistors 13 and 15.

The reed 5 of the synchronous vibrating switch 4 vibrates between the contacts 2 and 3 under the influence of the magnetic field produced by the current flowing in the coil 7. Due to the impedance of the coil 7 and the mechanical inertia of the reed 5, the motion of the reed 5 lags the voltage across the conductors $L_1$ and $L_2$. To correct for this lag, the condenser 8 is connected in series with the coil 7 across the secondary winding 9 of the transformer 10. This condenser causes the current in the coil 7 to lead the voltage across the conductors $L_1$ and $L_2$ by the amount necessary to correct for this lag and thus bring the motion of the reed 5 in phase with the voltage across the conductors $L_1$ and $L_2$. In addition, the motion of the reed 5 is synchronized with the transformer action of the motor 19 so that the contact 6 on the reed 5 engages the contact 2 during the half cycle of the line voltage in which the terminal 27 of the interconnected shading coils in negative with respect to the common terminal 29 and engages the contact 3 during the half cycle in which the terminal 28 is negative with respect to the common terminal 29.

When the contact 6 engages the contact 2 it applies the voltage from the battery 16 between the base and emitter of the transistor 13. This voltage biases transistor 13 so as to cause negative base current to flow therein. This negative base current reduces the impedances of the transistor collector circuit permitting a relatively large current to flow from the positive common terminal 29 of the interconnected shading coil through the emitter-collector circuit of the transistor 13 to the negative terminal 27, and through the shading coils 24 and 25. This current flowing in the shading coils 24 and 25 sets up a magnetic flux which interacts with the flux set up by the current flowing in the main motor winding and the flux set up by the current flowing in the rotor bars and tends to produce rotation of the motor in a clockwise direction. During this half cycle, the impedance of the emitter-collector circuit of the transistor 15 will be very high because the transistor 15 is not baised so as to be conductive. In addition, the collector to base circuit of the transistor 15 is open circuited and thus, very little current will flow in the interconnected shading coils 23 and 26.

During the next half cycle of the line voltage, the reed 5 moves downward causing the contact 6 to engage the contact 3 and disengage the contact 2. The battery 14 is then impressed across the emitter and base of the transistor 15 causing negative base current to flow in that transistor. This negative base current reduces the impedance of the transistor collector circuit permitting a relatively large amount of current to flow from the positive common terminal 29 through the emitter-collector circuit of the transistor 15 to the negative terminal 29 and through the shading coils 23 and 26. This current sets up a magnetic field which interacts with the magnetic field set up by the current in the main motor winding and the currents in the rotor bars and tends to produce rotation of the motor in a counterclockwise direction. During this half cycle, the impedance of the emitter-collector circuit of the transistor 13 is not biased so as to be conductive. In addition, the collector-base circuit of that transistor is open circuited and thus, very little current will flow in the interconnected shading coils 24 and 25.

As the reed 5 vibrates back and forth between the contacts 2 and 3 the motor 19 is alternately energized for rotation first in one direction and then in the other. If the contacts 6 of the vibrating reed 5 engages the contact 2 and the contact 3 for equal periods of time there is no net motor rotation produced during a given cycle of the reference voltage. If the contacts 2 and 3 are unequally spaced with respect to the vibrating reed 5, however, the contact 6 will engage one of those contacts for a longer interval than it will engage the other. Accordingly, one of the transistors will be biased so as to be conductive for a longer period than the other thereby producing a net rotation of the rotor in the direction controlled by that transistor. The greater the difference in the contacting times, the greater the speed of the motor will be in that direction.

Figure 2:
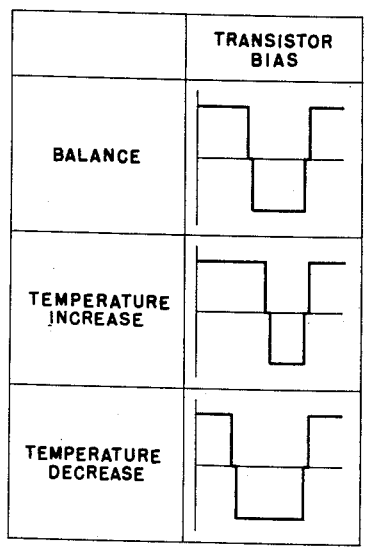
Fig. 2 is a table showing the bias voltages applied to the transistors employed in the circuit shown in Fig. 1 for various conditions of balance.

As shown in Fig. 1, the bimetallic element 1 controls the position of the contacts 2 and 3 with respect to the vibrating reed 5 and the contacts 6. A change in temperature will cause the unequal expansion or contraction of this element causing the relative position of contacts 2 and 3 to be varied accordingly. As shown in the table of Fig. 2, this will result in the unequal biasing of the transistors 13 and 15. This in turn causes the selective rotation of the rotor 21. The rotor 21 drives the drum 33 through the coupling means 32 which is operative to adjust the tension on the spring 35, connected to the bimetallic element 1, so as to restore the equality of contacting time. In so doing, it positions the indicator 34 to indicate the temperature corresponding to the position of the drum 33 with respect to the bi-metallic element.

Due to the amplifying properties of the transistors 13 and 15, a small change in base current will produce a large change in collector current. Thus, by the use of the transistors 13 and 15 it is possible to substantially reduce the amount of current passed by the vibrating switch 4. This results in eliminating harmful and deteriorating sparking at the switch contacts which insures longer and more efficient switch operation.

Figure 3:
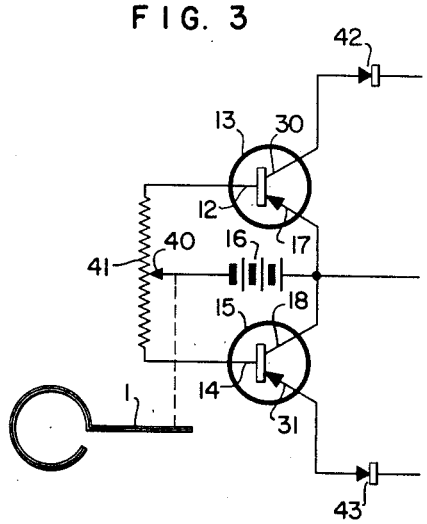
Fig. 3 shows a modification of the embodiment of this invention shown in Fig. 1.

Referring now to Fig. 3, there is shown a modification of the invention shown in Fig. 1 in which the bi-metallic element 1 controls the bias applied to the transistors 13 and 15 by positioning the sliding contact 40 on the slidewire 41. The slidewire 41 is connected between the base 12 of the transistor 13 and between the base 14 of the transistor 15. The sliding contact 40 is connected through the battery 16 to the emitter 17 and the emitter 18 of the transisors 13 and 15 respectively. The collector 30 of the transistor 13 is connected through the diode 42 to the terminal 27 of the motor 3 which is not shown and similarly the collector 31 of the transistor 15 is connected to the diode 43 to the terminal 28. The emitter 17 and 18 of the transistors 13 and 15 respectively are connected to the common shading coil terminal 29 which is also not shown.

The change in temperature will cause the unequal expansion of the bi-metallic element 1 which will position the sliding contact 40 on the slidewire 41 accordingly and thereby unequally bias the transistors 13 and 15. This unequal bias will cause one transistor to be more conductive than the other thereby causing one pair of shading coils to be more effective than the other producing motor rotation. The diodes 42 and 43 prevent conduction through the respective transistor collector and base circuits during the half cycles when the collectors are positive with respect to the emitters.

While, in accordance with the provisions of the statutes, there has been illustrated and described the best form of embodiment of the present invention now known, it will be apparent to those skilled in the art that changes may be made in the form of the apparatus disclosed without departing from the spirit of the invention as set forth in the appended claims, and in some cases certain features of this invention may be used to advantage without a corresponding use of other features.

Having now described our invention, what we claim as new and for which it is desired to secure Letters Patent is:

1. In combination, a shaded pole motor having a main motor winding and two pairs of interconnected shading coils with two end terminals and a common terminal, said interconnected shading coils being so connected that when said main motor winding is connected to a source of alternating current, voltages, which are 180° out of phase with each other, are produced in said two pairs of interconnected shading coils, a pair of transistors, each of said transistors being connected in a grounded emitter configuration to said interconnected shading coils, and a common biasing means for both of said transistors, said common biasing means including a synchronous vibrating switch adapted to alternately bias said transistors so as to be conductive.

2. A self balancing electrical apparatus comprising in combination a condition responsive element, a double pole single throw synchronous vibrating switch, means connecting said condition responsive element to the poles of said switch for adjusting the contacting time of said switch, a transistor amplifier having an input and an output, biasing means connected to the input of said amplifier through said vibrating switch, a reversible shaded pole motor, means connecting said motor to the output of said amplifier, and rebalancing means connecting said motor to said condition responsive element.

3. A self balancing measuring apparatus comprising in combination a phase sensitive transistor amplifier having an input and an output, biasing means connected to the input of said amplifier, said biasing means including a source of bias voltage, a condition responsive element, a synchronous vibrating switch for biasing said amplifier according to the phase of a change in the condition being measured, a reversible shaded pole motor connected to the output of said amplifier and means connecting said motor to said biasing means for rebalancing said system upon a change in the condition being measured.

4. In combination a reversible shaded pole motor having two pairs of interconnected shading coils, a pair of transistors, means connecting said interconnected shading coils to said transistors, common biasing means connected to both of said transistors, means for alternatively applying said biasing means to said transistors, and a condition responsive element connected to said last named means for controlling the relative time of the application of said bias to one of said pair of transistors as compared to the other of said pair of transistors.

5. In combination, a condition responsive element, a double pole single throw synchronous vibrating switch, means connecting said condition responsive element to the poles of said switch for adjusting the contacting time of said switch, a transistor amplifier having an input and an output, biasing means connected to the input of said amplifier through said vibrating switch, a reversible shaded pole motor, and means connecting said motor to the output of said amplifier.

6. A control for a shaded pole motor comprising a pair of transistors connected to the shading poles of said motor and adapted to be energized therefrom, biasing means for controlling the conductivity of said transistors and a synchronous switch for applying said biasing means to said transistors to switch said transistors from a non conducting state to a conducting state.

References Cited in the file of this patent

UNITED STATES PATENTS

| | | |
|---|---|---|
| 2,452,769 | Lang | Nov. 2, 1948 |
| 2,458,701 | Greenough | Jan. 11, 1949 |
| 2,486,935 | Fanta | Nov. 1, 1949 |
| 2,537,027 | Burkhart | Jan. 9, 1951 |
| 2,678,415 | Baylor | May 11, 1954 |